United States Patent
Snyder et al.

(10) Patent No.: US 6,177,982 B1
(45) Date of Patent: Jan. 23, 2001

(54) TEMPLATE FOR DIGITIZING SMALL FORMAT FILMS

(75) Inventors: Patricia D. Snyder, Pittsford; Charles A. Hasso, Webster; Louis P. Masi, Penfield, all of NY (US)

(73) Assignee: Eastman Kodak Company, Rochester, NY (US)

( * ) Notice: Under 35 U.S.C. 154(b), the term of this patent shall be extended for 0 days.

(21) Appl. No.: 09/085,421

(22) Filed: May 27, 1998

Related U.S. Application Data

(63) Continuation-in-part of application No. 09/085,566, filed on May 27, 1998.
(60) Provisional application No. 60/059,346, filed on Sep. 19, 1997.

(51) Int. Cl.[7] .............................. G09F 1/10; G03B 27/62
(52) U.S. Cl. ................................ 355/75; 40/701; 40/735; 358/487
(58) Field of Search .......................... 355/75, 122, 127; 40/701, 703, 704, 702, 735; 358/474, 487, 506; 382/319; 399/377, 378; 378/168, 174, 175

(56) References Cited

U.S. PATENT DOCUMENTS

| | | | | |
|---|---|---|---|---|
| 3,536,555 | * | 10/1970 | Thompson | 156/108 |
| 3,564,745 | * | 2/1971 | Johnson et al. | 40/702 |
| 3,873,405 | * | 3/1975 | Wilkes | 40/702 |
| 3,959,907 | * | 6/1976 | Anderson | 40/702 |
| 4,031,640 | * | 6/1977 | Hanna, Jr. et al. | 40/703 |
| 4,333,254 | * | 6/1982 | Stevenson | 40/701 |
| 4,351,124 | * | 9/1982 | Sivertsen et al. | 40/702 |
| 4,642,925 | * | 2/1987 | Thompson | 40/702 |
| 5,483,325 | * | 1/1996 | Bodapati et al. | 355/230 |
| 5,694,315 | * | 12/1997 | Huang et al. | 364/130 |

* cited by examiner

Primary Examiner—Alan A. Mathews
(74) Attorney, Agent, or Firm—William F. Noval

(57) ABSTRACT

A template for positioning small format films on the platen of a flatbed scanner for reducing flare during scanning, the template comprising: a thin rectangular member of opaque material, the member having a plurality of rectangular apertures for receiving small format films; and indicia associated with each aperture for assisting in the proper placement of a small format film in the aperture.

2 Claims, 2 Drawing Sheets

TEMPLATE FOR DIGITIZING SMALL FORMAT FILMS

CROSS REFERENCE TO RELATED APPLICATIONS

This continuation-in-part application claims the benefit under 35 USC § 120 of the earlier filing date in the United States of U.S. patent application Ser. No. 09/085,566, filed May 27, 1998, which claims the benefit under 35 USC 119(e) of U.S. Provisional Patent Application Serial No. 60/059,346, filed Sep. 19, 1997.

FIELD OF THE INVENTION

This invention relates in general to the field of digital data acquisition using flatbed scanners. A primary application of the invention relates to the automatic digitization and processing of small format films, such as dental x-ray radiographs.

BACKGROUND OF THE INVENTION

Film digitization using flatbed scanners can be a practical alternative to direct digital image capture or other means of digital image acquisition such as storage phosphor computed radiography. For example, hybrid imaging systems can provide an expedient and low cost imaging solution for both dentists and insurance companies. Without the more significant capital investment required for other digital devices, the dental practitioner can have the advantages that the digital modality can offer, such as imaging capability to support practice management and electronic insurance claims. Insurance companies are also motivated to incorporate imaging into electronic claims in order to reduce overhead associated with manual claims submission.

An important step in any hybrid imaging system is the initial image capture, which for film digitization is the scanning process. Exposure conditions should be carefully controlled during image acquisition so that any subsequent processing steps can be implemented in a more desired fashion. In practice this means controlling unwanted exposure or flare and maintaining proper alignment of the scanned image with the optical configuration of the scanner. Because the relative size of the platen on a flatbed scanner is great compared to a small format film such as a smaller format dental radiograph, the concern over unwanted flare becomes an issue.

Dental radiographs vary greatly in practice. X-ray exposure levels and processing of these films contribute to variability of dental films. A dental film can range from a very light "under-exposed" image to a very dark in appearance "over-exposed" image. Where there is too much exposure on the platen when scanning an under-exposed radiograph, for example, the captured image will not have enough gray value content. Another important consideration during image capture is the alignment of the radiograph on the platen in the correct horizontal and vertical directions to maintain consistency with, for example, the CCD array of a scanner. If the image does not correspond to this alignment when placed on the platen, image rotation may be required, which can alter the aspect ratio of the original image.

One other consideration in the placement of dental radiographs on the platen relates to the actual viewing of the image so that the anatomical structures will be seen digitally in the same orientation as seen on the original radiograph. Smaller format dental films contain a dimple that, when observed properly, points outward toward the viewer in a position corresponding to standard practices in dentistry. Placing the film on the platen in a manner corresponding to this practice can avoid flipping the digital image so that the perspective remains the same as in the radiograph.

U.S. Pat. No. 5,483,325 describes an accessory frame that can be mounted on a photocopier or electronic flatbed scanner that facilitates location and removal of small originals like business cards. This patent does not address the problems described above relating to digitization of small format films using a flatbed scanner, such as regulating exposure and aligning the films on the platen consistent in a manner that is useful to the dental practitioner. This patent does not address the problem of flare in copying transparent originals.

SUMMARY OF THE INVENTION

According to the present invention, there is provided a solution to the problems of the prior art.

According to a feature of the present invention, there is provided a template for use on a flatbed scanner for digitizing small format films, such as dental radiographs.

According to a further feature of the present invention, there is also provided a template for positioning small format films on the platen of a flatbed scanner for reducing flare during scanning, the template comprising: a thin rectangular member of opaque material, the member having a plurality of rectangular apertures for receiving small format films; and indicia associated with each aperture for assisting in the proper placement of a small format film in the aperture.

ADVANTAGEOUS EFFECT OF THE INVENTION

The invention has the following advantages.

1. The template of the invention is a low cost accessory which can be easily set firmly on any conventional platen of a flatbed scanner.

2. It can be produced using common plastic material.

3. It helps to reduce unwanted flare during the scanning of small format films placed on a large platen of a flatbed scanner.

4. It assists in orienting the small format films in a manner consistent with the horizontal and vertical scanning direction of the optical configuration of the scanner. This reduces the need for image rotation.

5. Dental radiographs having dimples can be properly aligned with corresponding mark indicators on the template for proper orientation.

DETAILED DESCRIPTION OF THE INVENTION

Figure 1:
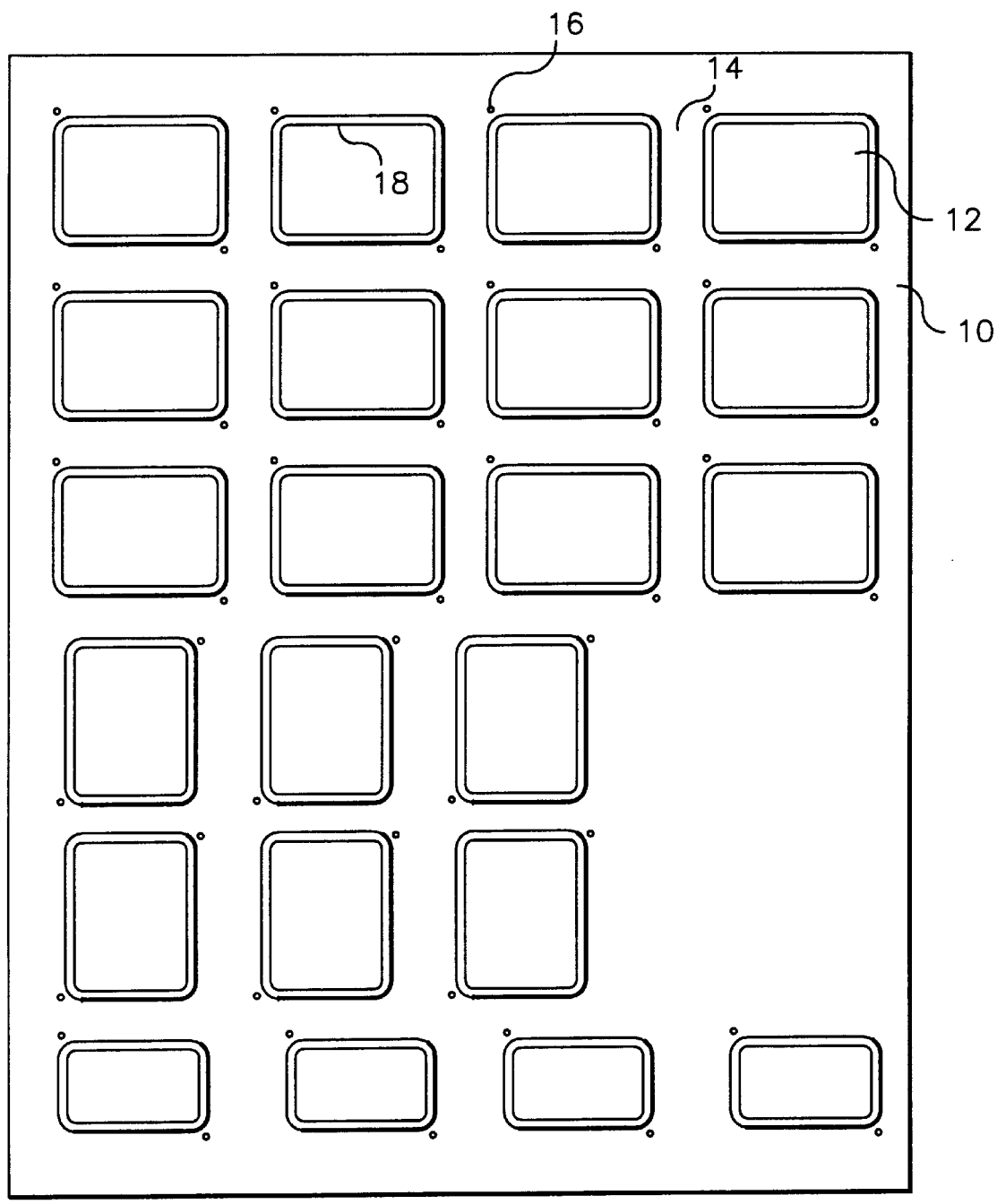
FIG. 1 is a diagrammatic view of one embodiment of the present invention.

Referring now to FIG. 1, there is shown an embodiment of the template of the present invention. This template is removable and is easily placed on a flatbed scanner platen. As shown, template 10 contains apertures 12 to accommodate the film sizes to be digitized. These films are placed directly in the apertures 12. Apertures 12 can be dimensioned to accommodate size 0, 1, 2, 3, and 4 dental films.

The regions 14 around these apertures 12 are opaque to reduce unwanted flare during scanning. The material of template 10 should be ideally black with a matte finish (such as any common plastic). Located next to each aperture 12 are two indicators 16 which facilitate placement of the dental film to orient it properly in a manner consistent with practical viewing of the film image. Other indicia may be included to assist in properly orienting the film.

Each aperture 12 is provided with a lip 18 so that the film may be securely placed in the aperture to prevent light passing through the edge of the film and edge of the aperture during scanning.

Figure 2:
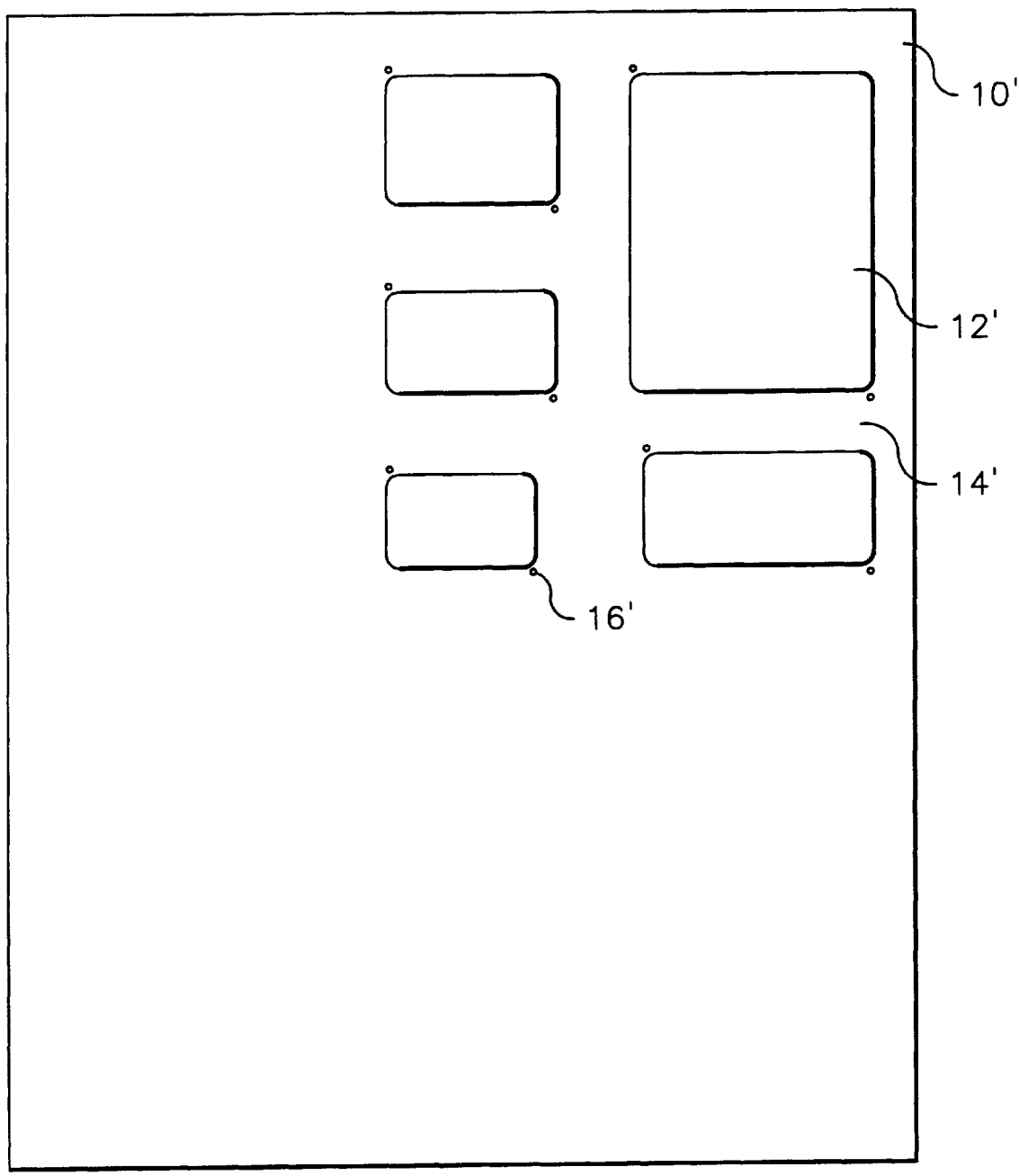
FIG. 2 is a diagrammatic view of another embodiment of the present invention.

Referring now to FIG. 2, there is shown another embodiment of the present invention. As shown, template 10' is provided with aperture 12' surrounded by opaque areas 14'. Indicia 16' are provided to properly orient dental radiographs. No lip 18 is provided in aperture 12' so that information contained in the perimeter of a dental radiograph placed in aperture 12' can be captured.

Although the invention has been described above with respect to placement of dental radiographs in template apertures, it will be understood that other types of radiographs or films can be used with the template of the present invention.

The invention has been described in detail with particular reference to certain preferred embodiments thereof, but it will be understood that variations and modifications can be effected within the spirit and scope of the invention.

PARTS LIST

10,10' template
12,12' apertures
14 regions
14' opaque areas
16 indicators
16' indicia
18 lip

What is claimed is:

1. A template for positioning small format dental radiographs on the platen of a flatbed scanner, said template comprising;

a thin rectangular member of opaque material, said member having a plurality of rectangular apertures sized to receive small format dental radiographs having at least one dimple which points outwardly towards the viewer when observed properly; and indicia associated with each aperture located so that said indicia is aligned with a dimple on a received small format dental radiograph when said radiograph is properly placed within said aperture.

2. The template of claim 1 wherein said template is adapted to receive small format dental radiographs having a dimple at a corner of said radiograph and wherein said indicia is located at a corner of an aperture which aligns with the dimple of a radiograph properly placed within said aperture.

* * * * *